US007740228B2

(12) United States Patent
Simpson et al.

(10) Patent No.: US 7,740,228 B2
(45) Date of Patent: Jun. 22, 2010

(54) VALVE ASSEMBLY INCLUDING A TORSION SPRING COUPLING A VALVE SHAFT AND ACTUATOR SHAFT

(75) Inventors: Scott W. Simpson, Westhampton, MA (US); Peter Dowd, North Granby, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 128 days.

(21) Appl. No.: 11/501,422

(22) Filed: Aug. 9, 2006

(65) Prior Publication Data

US 2008/0035869 A1 Feb. 14, 2008

(51) Int. Cl.
*F16K 1/22* (2006.01)
(52) U.S. Cl. .................. 251/308; 251/305; 251/337; 251/77
(58) Field of Classification Search .................. 251/305, 251/306, 307, 308, 337, 77
See application file for complete search history.

(56) References Cited

U.S. PATENT DOCUMENTS

| 1,712,219 | A | | 5/1929 | Knudsen |
| 4,090,589 | A | * | 5/1978 | Fitzwater ................. 185/40 R |
| 4,757,684 | A | | 7/1988 | Wright |
| 5,334,095 | A | | 8/1994 | Colling et al. |
| 6,079,210 | A | | 6/2000 | Pintauro et al. |
| 6,244,565 | B1 | * | 6/2001 | McDonnell et al. ..... 251/129.12 |
| 6,390,062 | B1 | * | 5/2002 | Saito et al. ................. 123/399 |
| 6,684,898 | B2 | | 2/2004 | Wiggins et al. |
| 6,938,597 | B2 | | 9/2005 | Klein et al. |
| 6,997,438 | B2 | * | 2/2006 | Fauni ......................... 251/305 |
| 2003/0056836 | A1 | | 3/2003 | Gagnon |

FOREIGN PATENT DOCUMENTS

| DE | 10123560 | 11/2002 |
| DE | 10207060 | 8/2003 |
| EP | 1505281 | 2/2005 |

OTHER PUBLICATIONS

European Search Report - EP 07 25 2707 - dated Nov. 7, 2007, 6 pages.

* cited by examiner

*Primary Examiner*—John K Fristoe, Jr.
(74) *Attorney, Agent, or Firm*—Kinney & Lange, P.A.

(57) ABSTRACT

A valve assembly comprises a flow control valve including a valve shaft, an electrical actuator comprising an actuator output shaft, and a torsion spring coupling the valve shaft and the actuator output shaft.

14 Claims, 2 Drawing Sheets

VALVE ASSEMBLY INCLUDING A TORSION SPRING COUPLING A VALVE SHAFT AND ACTUATOR SHAFT

BACKGROUND

The present invention relates to a valve assembly. More particularly, the present invention relates to a valve assembly including a valve shaft that is coupled to an actuator output shaft with a torsion spring.

A valve assembly, such as a butterfly valve assembly or a ball valve assembly, may be used to control the flow of fluid through a passage, such as tubing or ducting. In this way, the valve assembly may also be referred to as a "flow control valve" or a "pressure control valve." Typically, a valve member disposed in a valve body controls the flow of fluid through the valve body (which may be connected to other tubing or ducting). In the case of a butterfly valve assembly, the valve member is a valve disc disposed in the valve body and has different angular positions that relate to different fluid flow rates. For example, the valve disc may rotate between a 0° position (open) and a 90° position (closed), where the angles are determined with respect to a center axis of the passage.

An electrical/electromechanical rotary actuator may be used to rotate the valve disc to a desired angular position in order to control the flow rate through the valve body. In one configuration, the actuator includes an actuator output shaft that is rigidly connected to a valve shaft, which is coupled to the valve disc. As the actuator output shaft rotates (in response to an electrical and/or pneumatic signal inputted to the actuator), the rotational movement (or torque) is translated (or transmitted) to the valve shaft, which rotates the valve disc. In order to select the angular position of the valve disc, an electrical device/stop/switch is provided to the actuator to stop the actuator output shaft from rotating. Typically, the electrical signal provided to the actuator is proportional to the position of the valve disc.

Butterfly valve designs that incorporate an internal face seal between the valve body and disc have a physical stop. The degree of surface contact force between the valve disc and valve body at the stop influences the ability of the face seal to seal. After the valve disc contacts the physical stop, the disc and valve shaft are prevented from further rotating towards the physical stop.

It has been found that when the physical stop is contacted prior to the electrical stop of the actuator (e.g., due to hardware tolerance stack-up or misassembly), the actuator output shaft is stopped from rotating, but the electrical current to the actuator is not severed. As a result, the actuator may overheat and prematurely fail. Conversely, during valve closing, if the electrical stop/switch is activated prior to the valve disc contacting the face seal stop, the ability of the valve disc to seal may be adversely affected.

BRIEF SUMMARY

The present invention is a valve assembly for controlling a flow of fluid through a passage, such as a valve body. The valve assembly includes a valve and an actuator. The valve includes a valve member disposed in the passage and movable between an open and closed position, and a valve shaft coupled to the valve member. The actuator includes an actuator output shaft that is coupled to the valve shaft with a torsion spring, which translates torque/rotational movement from the actuator output shaft to the valve shaft. The valve member angular position is adjusted by rotating the actuator output shaft. The torsion spring provides a compliant connection between the actuator output shaft and valve shaft, and compensates for any angular difference/deviation between the actuator output shaft and valve shaft. For example, the torsion spring allows the actuator output shaft to continue rotating in the event that an electrical signal to the actuator is not severed after the valve member reaches a closed position. Conversely, in a situation where the electrical signal stops prior to the valve member reaching a closed position, the torsion spring, if preloaded, helps bias the valve member towards the closed position.

DETAILED DESCRIPTION

Figure 1A:
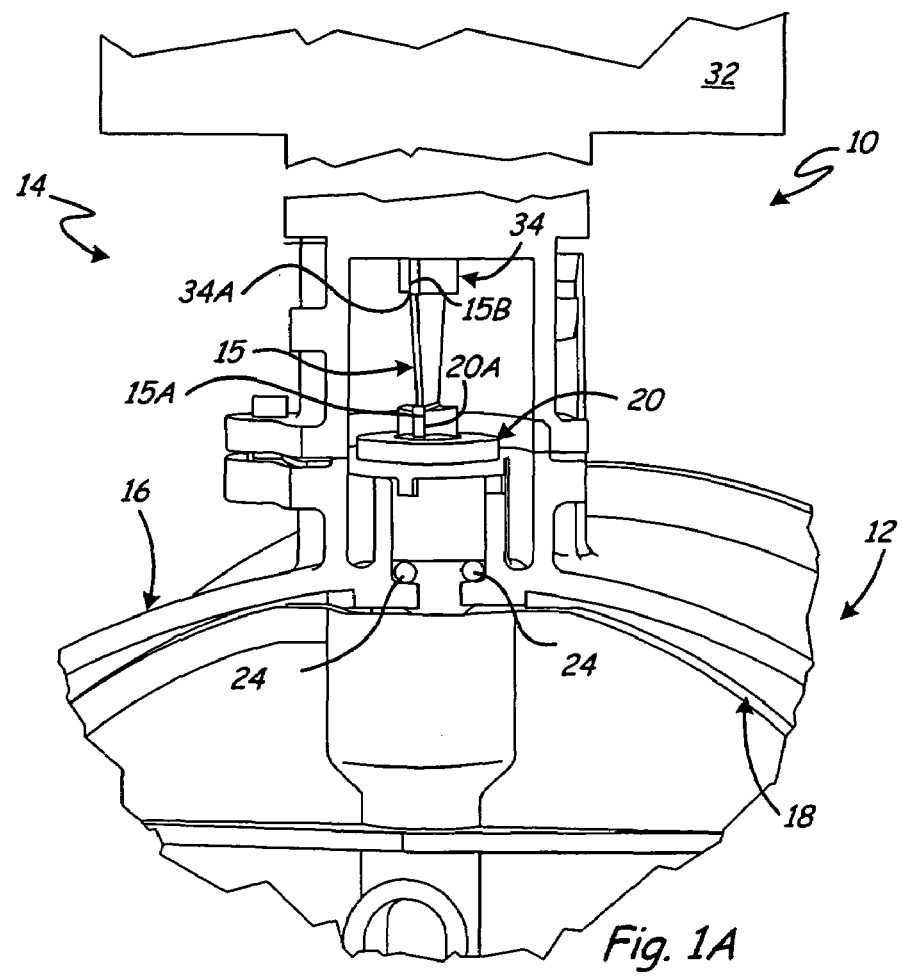
FIG. 1A is a partial perspective cross-sectional view of a valve assembly in accordance with a first embodiment of the present invention, which includes a valve with a valve shaft and an actuator with an actuator output shaft, where the valve shaft and actuator output shaft are coupled together with a flat torsion spring.

FIG. 1A is a partial perspective cross-sectional view of valve assembly 10 in accordance with a first embodiment of the present invention, which is suitable for controlling the flow of a fluid through a passage, such as tubing, ducting, etc. Valve assembly 10 includes butterfly valve 12, electrical/mechanical actuator 14, and flat torsion spring 15. Butterfly valve 12 includes a generally cylindrical valve body 16, valve disc 18, and valve shaft 20. Valve body 16 defines a fluid passage 21 (shown in FIG. 1B) and may be stainless steel or another suitable material. In alternate embodiments, valve body 16 is another annular shape (e.g., elliptical, oval, circular) or another suitable shape. Disposed within valve body 16 is valve disc 18, which is rotatable between an open and closed position. Valve shaft 20 is coupled to disc 18, and shaft 20 may be rotated in order to select a position of disc 18 (e.g., open, closed or a position therebetween). Shaft 20 is positioned between a pair of bearings 24, which allows shaft 20 to rotate freely within valve body 16. The flow of a fluid through valve body 16 is manipulated by adjusting the position of disc 18 with respect to center axis 22 of shaft 20.

Figure 1B:
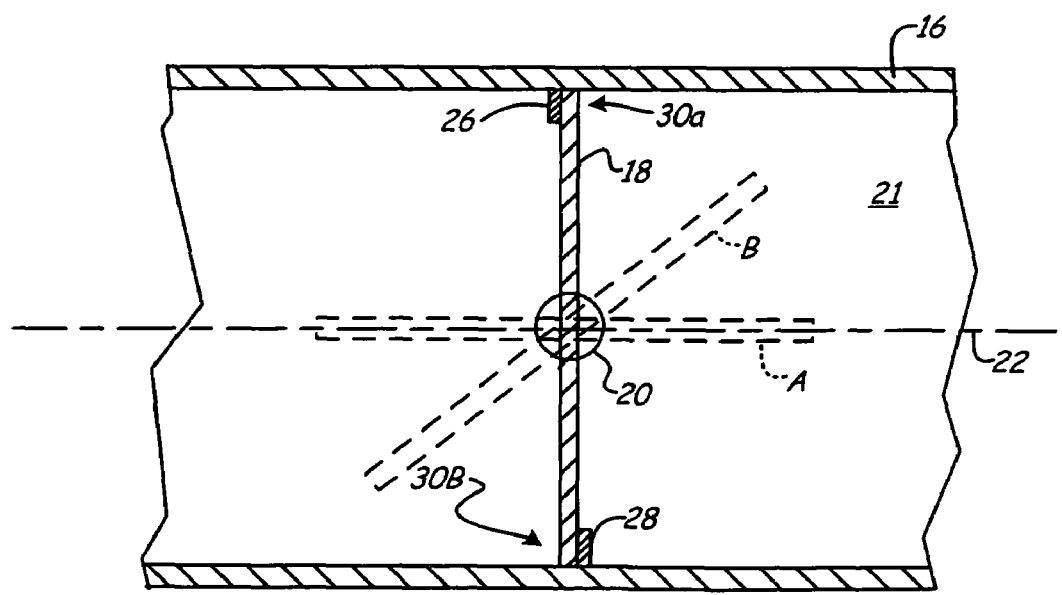
FIG. 1B is a cross-sectional plan view of the valve assembly of FIG. 1A.

FIG. 1B is a cross-sectional view of butterfly valve 12, which includes valve body 16 defining fluid passage 21, valve disc 18, valve shaft 20, first stop 26, and second stop 28. As FIG. 1B illustrates, when disc 18 of butterfly valve 12 is in the closed position, disc 18 is substantially perpendicular (i.e., a 90° position) to center axis 22 of fluid passage 21. When disc 18 is in an open position (position A, in phantom), disc 18 is substantially parallel (i.e., a 0° position) to center axis 22. FIG. 1B also illustrates position B of disc 18 (in phantom), which is between the open and closed positions.

The position of disc 18 with respect to stops 26 and 28 also affects the rate of flow of a fluid through passage 21. Disc 18 rests against first and second stops 26 and 28 in the closed position, thereby preventing fluid from passing past disc 18. Stops 26 and 28 help define a stopping point for disc 18 in its closed position as well as help prevent fluid from flowing through regions 30A and 30B when disc 18 is in its closed position. Stops 26 and 28 may also be referred to as "face seals" or "seals" because stops 26 and 28 help seal regions 30A and 30B against fluid flow. The degree of surface contact between valve disc 18 and valve body 16 at stops 26 and 28 influences the ability of disc 18 to seal passage 21. After disc 18 contacts stops 26 and 28, disc 18 and valve shaft 20 are prevented from further rotating towards stop 26 and 28 (in FIG. 1B, in the counterclockwise direction).

Returning to FIG. 1A, electrical actuator assembly 14 includes electrical actuator 32 and output shaft 34, which is mechanically coupled to and driven by electrical actuator 32. In order to adjust the position of valve disc 18, and thereby manipulate the flow of fluid through passage 21 (shown FIG. 1B), an electrical signal is provided to actuator 32, which then rotates output shaft 34 accordingly. In one embodiment, the degree of rotation of output shaft 34 is proportional to the electrical signal provided to actuator 32. Output shaft 34 is mechanically coupled to valve shaft 20 with torsion spring 15, which translates the rotational movement (or torque) of output shaft 34 to valve shaft 20. The rotation of valve shaft 20 rotates disc 18 because valve shaft 20 is mechanically coupled to disc 18. In a typical actuator 32, actuator 32 stops rotating shaft 34 in response to "electrical stop," whether it be a specific electrical signal inputted to actuator 32, severing power to actuator 32, or otherwise.

Flat torsion spring 15 provides a compliant drive link that transmits rotational movement/torque of output shaft 34 of actuator 14 to valve shaft 20 and disc 18 of valve 12. First end 15A of torsion spring 15 is connected to valve shaft 20, while second end 15B is connected to output shaft 34 of actuator assembly 14. Any suitable means of connecting torsion spring 15 to valve shaft 20 and output shaft 34 may be used in accordance with the present invention, including a mechanical attachment means as well as an adhesive or welding means. In the first embodiment illustrated in FIG. 1A, valve shaft 20 and output shaft 34 each include a slot that is configured to receive the respective end 15A and 15B of spring 15. More specifically, slot 20A in valve shaft 20 is configured to receive and retain first end 15A of torsion spring 15 and slot 34A in output shaft 34 is configured to receive and retain second end 15B of torsion spring 15.

The angular position of valve disc 18, which is proportional to the angular position of valve shaft 20, affects the rate of flow of a fluid through passage 21. Ideally, the angular position of valve disc 18 is proportional to the angular position of output shaft 34 of actuator 14 so that the position of valve disc 18 can be predictably selected by rotating output shaft 34. In order to close disc 18 to stop the flow of fluid through passage 21, disc 18 (and valve shaft 20, which has the same angular value as valve disc 18) is placed in a 90° position. In order to achieve the 90° position of disc 18, actuator 32 rotates output shaft 34 to a 90° angle position. However, due to mismatched tolerances, misassembly, or other reasons, the 90° angle position of actuator output shaft 34 as determined by actuator 32 may not match the 90° position of disc 18 and valve shaft 20. This is referred to as an "angular difference/deviation." Due to the angular difference/deviation, an electrical stop may be prematurely provided to actuator 32 or valve disc 18 may prematurely contact surfaces 26 and 28 (i.e., before actuator 32 receives an electrical stop). For example, when an electrical stop is provided to actuator 32 before valve disc 18 contacts stops 26 and 28, output shaft 34 may be in a 90° position, while valve disc 18 and valve shaft 20 are in a 88° position. In this situation, valve disc 18 does not contact stops 26 and 28, and further rotation of valve shaft 20 and valve disc 18 is required to close valve disc 18. However, output shaft 34 has stopped rotating because actuator 32 has stopped in response to the premature electrical stop. This may be problematic because fluid is likely to flow past regions 30A and 30B 30 (shown in FIG. 1B).

Assembly 10 in accordance with the present invention utilizes torsion spring 15 to couple valve shaft 20 and output shaft 34 in a manner that compensates for any angular difference/deviation between shafts 20 and 34. Torsion spring 15 is stiff enough to transmit the rotational output of output shaft 34 to valve shaft 20, while at the same time compliant enough to absorb excess torque of output shaft 34 or provide torsional flexure to bias valve disc 18 against stops 26 and 28. Further, because torsion spring 15 is compliant, valve shaft 20 and output shaft 24 do not need to be coaxial (of course, in some embodiments, valve shaft 20 and output shaft 24 are coaxial). In an alternate embodiment, assembly 10 may include more than one torsion spring between valve shaft 20 and output shaft 34.

When an electrical stop is prematurely provided to actuator 32 and output shaft 34 prematurely stops rotating before valve disc 18 contacts stops 26 and 28, torsion spring 15 helps bias valve disc 18 towards stops 26 and 28 because torsion spring 15 is preloaded with a torsional load. One means of preloading torsion spring 15 is by adding additional "twist" to torsion spring 15 during initial installation of spring 15. For example, if valve shaft 20 and output shaft 34 are each in a 90° position when valve disc 18 is in its 90° position (i.e., the closed position), torsion spring 15 may be preloaded by twisting torsion spring 15 to a 93° position with respect to the valve shaft 20 and output shaft 34, resulting in a pretwist of about 3°. In alternate embodiments, the pretwist may be between about 2° to about 5°, or any other suitable angular range, depending on the type and application of the torsion spring. Pretwisting torsion spring 15 preloads torsion spring 15, which enables torsion spring 15 to provide a contact load between valve disc 18 and stops 26 and 28, which improves the ability of disc 18 to seal regions 30A and 30B when disc 18 is in a closed position. It was found that in one example, a pretwist of about 30 in a flat torsion spring formed of a spring steel exhibiting a modulus of elasticity of about $1.93 \times 10^8$ kilopascals ($2.8 \times 10^7$ pounds/inch$^2$) exhibited a torsional load of about 5.76 kilogram centimeters (5 pound inches) to 9.22 kilogram centimeters about (8 pound inches), which may be suitable for a pneumatic application of assembly 10. Of course, in alternate embodiments, torsion spring 15 may not be preloaded.

If an electrical signal continues to drive actuator 32 even after disc 18 contacts stops 26 and 28, torsion spring 15 enables output shaft 34 of actuator assembly 14 to continue rotating, even though disc 18 and valve shaft 20 are stopped from further rotation. This helps prevent actuator 32 from failing due to overheating. Output shaft 24 is able to continue rotating because torsion spring 15 provides a compliant interface between valve shaft 20 and output shaft 34 such that output shaft 34 may rotate without requiring valve shaft 20 to rotate. In contrast, in existing valve assemblies, a valve shaft is rigidly connected to an actuator output shaft, such that the output shaft may only rotate if the valve shaft is able to rotate.

Torsion spring 15 may be any suitable torsion spring known in the art. Factors in determining the suitable design (e.g., geometry and material attributes) of torsion spring 15 for a particular assembly include the operational valve shaft 20 loads, torsional output levels of actuator assembly 14, and the degree of pretwist (or "flex" or "wind-up") required from torsion spring 15. In the first embodiment illustrated in FIGS. 1A and 1B, torsion spring 15 is formed of a spring steel and has a rectangular cross-section.

Figure 2A:
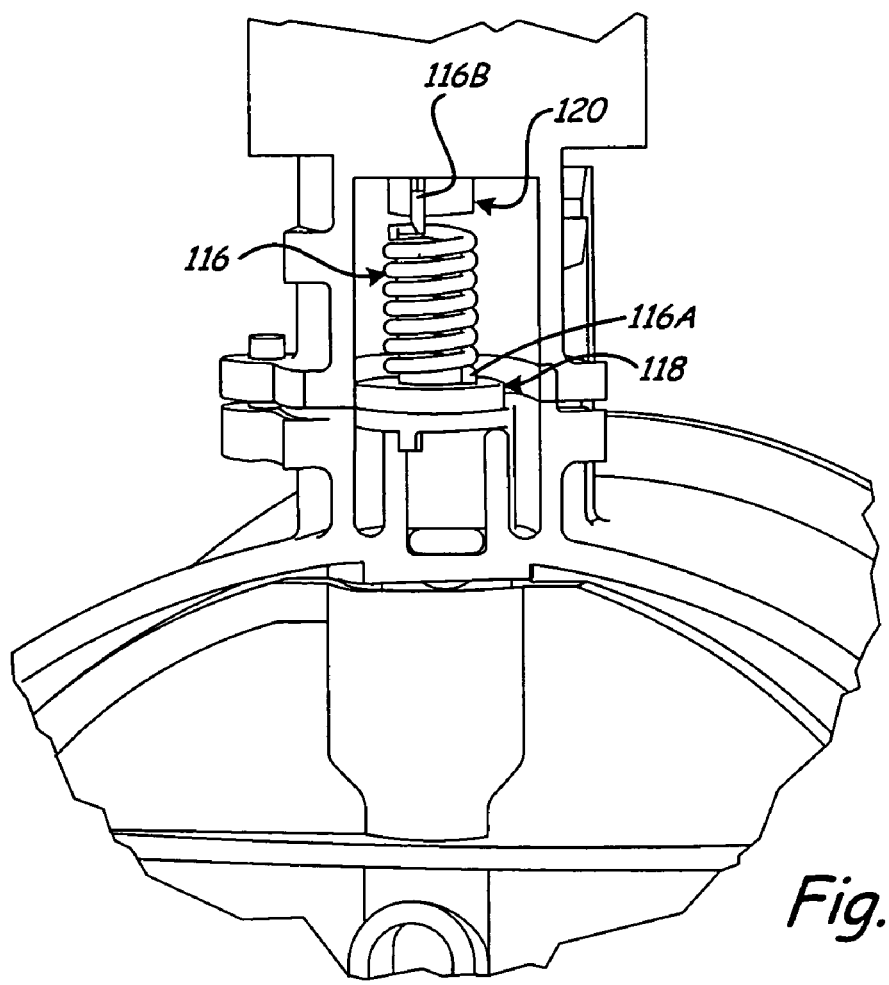
FIG. 2A is a partial perspective cross-sectional view of a valve assembly in accordance with a second embodiment of the present invention, where a valve shaft and an actuator output shaft are coupled together with a helical torsion spring.

A torsion spring having a round wire cross-section may also be used in accordance with the present invention, as illustrated in FIG. 2A, which is a partial perspective cross-sectional view of assembly 100 in accordance with a second embodiment of the present invention. Assembly 100 includes butterfly valve 112, electrical actuator assembly 114, and helical torsion spring 116. Assembly 100 is similar to assembly 10 of FIGS. 1A-1B, except that assembly 100 includes helical torsion spring 116, rather than flat torsion spring 15 with a first embodiment of the present invention.

First end 116A of helical torsion spring 116 is attached to valve shaft 118 and second end 116B is attached to output shaft 120 of actuator assembly 114. More specifically, first end 116A of helical torsion spring 116 includes opening 122 (shown in FIG. 2B) configured to receive a corresponding protrusion in valve shaft 116 and second end 116B includes opening 124 (shown in FIG. 2B) configured to receive a protrusion in valve shaft 116. In an alternate embodiment, another suitable means of attaching helical torsion spring 116 to valve shaft 118 and output shaft 120 may be used. For example, valve shaft 118 and output shaft 120 may each include slots that are configured to receive first and second end 116A and 116B, respectively, of helical torsion spring 116.

Figure 2B:
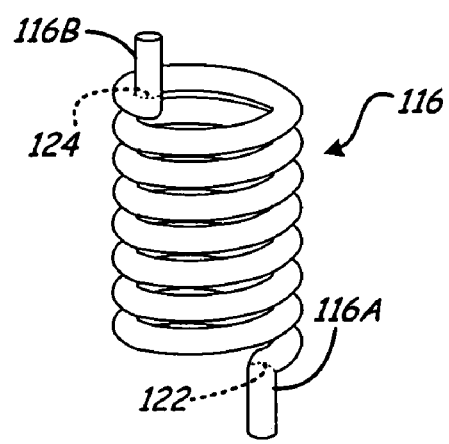
FIG. 2B is a perspective view of the helical spring of FIG. 2.

FIG. 2B is a perspective view of helical torsion spring 116 and illustrates opening 122 (in phantom) in first end 116A and opening 124 (in phantom) in second end 116B.

The present invention is not limited to the specific examples of a butterfly valve, electrical actuator, and flat and helical torsion springs illustrated in FIGS. 1A-2B. Rather, the present invention is any valve assembly (e.g., ball valve assembly or a butterfly valve assembly) that includes a movable valve member attached to a valve shaft, where the valve shaft is coupled to an actuator output shaft with a torsion spring. The valve assembly may be used to regulate/adjust the flow of a fluid, such as air or a liquid. Furthermore, a valve assembly in accordance with the present invention is also suitable for use in both hot and cold temperature applications. In a hot temperature application, a torsion spring composed of a spring steel including a high nickel content may be used.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A valve assembly for controlling a flow of fluid through a fluid passage, the valve assembly comprising:
    a valve comprising:
        a valve member disposed in the fluid passageway;
        a stop member, wherein a position of the valve member with respect to the stop member affects the rate of fluid flow through the passageway; and
        a valve shaft mechanically coupled to the valve member, wherein the valve shaft and valve member are in a 90° position when the valve member is in a closed position which does not allow the flow of fluid past the valve member, the closed position comprising the valve member and stop member coming into contact with each other;
    an electrical actuator having an electrical stop and comprising an actuator output shaft configured to rotate; and
    a flat torsion spring having a first end and a second end, the first end being coupled to the actuator output shaft and the second end being coupled to the valve shaft, the actuator output shaft driven by the electrical actuator and mechanically coupled to the second end of the torsion spring, wherein the torsion spring forms a sole drive link between the actuator output shaft and the valve shaft to translate torque from the actuator output shaft to the valve shaft in order to adjust the position of the valve member.

2. The valve assembly of claim 1, wherein when the valve member is in the open position, the valve shaft and valve member are in a 0° position, and wherein when the valve member is in a closed position, the valve shaft and valve member are in a 90° position, and wherein the torsion spring is pretwisted about 2° to about 5° with respect to the 90° position of the valve shaft and valve member.

3. The valve assembly of claim 1, wherein the flow control valve is selected from a group consisting of: a butterfly valve and a ball valve.

4. The valve assembly of claim 1, wherein the torsion spring is composed of a material comprising a spring steel.

5. The valve assembly of claim 1, wherein the flat torsion spring is preloaded.

6. The valve assembly of claim 5, wherein the flat torsion spring is preloaded with a torsional load of about 5.76 to about 9.22 kilogram centimeters.

7. An assembly for controlling a flow of fluid through a fluid passage, the assembly comprising:
    an electrical actuator having an electrical stop;
    a valve comprising:
        a valve member disposed in the fluid passageway;
        a stop member, wherein a position of the valve member with respect to the stop member affects the rate of fluid flow through the passageway; and
        a valve shaft mechanically coupled to the valve member, wherein the valve shaft and valve member are in a 90° position when the valve member is in a closed position which does not allow the flow of fluid past the valve member, the closed position comprising the valve member and stop member coming into contact with each other;
    a torsion spring having a first end and a second end, the first end being mechanically coupled to the valve shaft, the torsion spring being pretwisted to bias the valve member into the closed position after the electrical stop is prematurely reached by the electrical actuator; and
    an actuator output shaft driven by the electrical actuator and mechanically coupled to the second end of the torsion spring, wherein the torsion spring forms a sole drive link between the actuator output shaft and the valve shaft to translate torque from the actuator output shaft to the valve shaft in order to adjust the position of the valve member.

8. The valve assembly of claim 7, wherein the torsion spring is pretwisted about 2° to about 5° with respect to the 90° position of the valve shaft.

9. The valve assembly of claim 7, wherein the valve member is a disc.

10. The assembly of claim 7, wherein the torsion spring is composed of a material comprising a spring steel.

11. A method for actuating a valve member, the system comprising:
    providing an electrical signal to an actuator comprising an actuator output shaft;

rotating the actuator output shaft in response to the electrical signal, wherein the electrical signal is proportional to the degree of rotation of the actuator output shaft;

transmitting torque solely through a torsion spring drive link from the actuator output shaft to a valve shaft coupled to the valve member to cause the valve shaft and valve member to rotate in response to rotation of the actuator output shaft; and biasing the torsion spring drive link such that when the electrical stop is prematurely reached to stop rotation of the actuator output shaft the valve member will be driven to a closed position which does not allow the flow of a fluid past the valve member.

12. The method of claim 11, wherein the torsion spring is preloaded with a torsional load of about 5.76 to about 9.22 kilogram centimeters.

13. The method of claim 11, wherein the valve member is a disc.

14. The method of claim 11, wherein the torsion spring is composed of a material comprising a spring steel.

* * * * *

UNITED STATES PATENT AND TRADEMARK OFFICE
CERTIFICATE OF CORRECTION

| | |
|---|---|
| PATENT NO. | : 7,740,228 B2 |
| APPLICATION NO. | : 11/501422 |
| DATED | : June 22, 2010 |
| INVENTOR(S) | : Scott W. Simpson and Peter Dowd |

It is certified that error appears in the above-identified patent and that said Letters Patent is hereby corrected as shown below:

Col. 6, line 1-10,
   delete "a flat torsion spring having a first end and a second end, the first end being coupled to the actuator output shaft and the second end being coupled to the valve shaft, the actuator output shaft driven by the electrical actuator and mechanically coupled to the second end of the torsion spring, wherein the torsion spring forms a sole drive link between the actuator output shaft and the valve shaft to translate torque from the actuator output shaft to the valve shaft in order to adjust the position of the valve member.",
   insert --a flat torsion spring having a first end and a second end, the first end being mechanically coupled to the actuator output shaft and the second end being mechanically coupled to the valve shaft, the flat torsion spring being pretwisted to bias the valve member into the closed position after the electrical stop is prematurely reached by the electrical actuator, wherein the actuator output shaft is driven by the electrical actuator and mechanically coupled to the second end of the flat torsion spring, and wherein the flat torsion spring forms a sole drive link between the actuator output shaft and the valve shaft to translate torque from the actuator output shaft to the valve shaft in order to adjust the position of the valve member.--

Signed and Sealed this
Twenty-second Day of February, 2011

David J. Kappos
*Director of the United States Patent and Trademark Office*